(12) United States Patent
Bender et al.

(10) Patent No.: US 7,455,373 B2
(45) Date of Patent: Nov. 25, 2008

(54) ENGINE WELDER CABINET

(75) Inventors: David J. Bender, Chardon, OH (US); David E. Osicki, Leroy Township, OH (US)

(73) Assignee: Lincoln Global, Inc., City of Industry, CA (US)

( * ) Notice: Subject to any disclaimer, the term of this patent is extended or adjusted under 35 U.S.C. 154(b) by 279 days.

(21) Appl. No.: 11/132,481

(22) Filed: May 19, 2005

(65) Prior Publication Data

US 2006/0261715 A1  Nov. 23, 2006

(51) Int. Cl.
*A47B 88/00* (2006.01)
*A47B 91/00* (2006.01)
*A47B 97/00* (2006.01)
*B23K 9/10* (2006.01)

(52) U.S. Cl. ............... 312/328; 312/351.1; 219/133; 248/500

(58) Field of Classification Search ............... 312/328, 312/327, 322, 323, 312, 351.1, 304–307, 312/309–311, 291, 292, 293.1, 293.2, 293.3, 312/245; 248/500; 49/213, 142, 143, 145

See application file for complete search history.

(56) References Cited

U.S. PATENT DOCUMENTS

| | | | | | |
|---|---|---|---|---|---|
| 2,708,088 | A | * | 5/1955 | Steinke | 248/221.12 |
| 2,740,471 | A | * | 4/1956 | Follett | 160/32 |
| 2,849,270 | A | * | 8/1958 | Warnock | 312/328 |
| 2,891,834 | A | * | 6/1959 | Lake | 312/307 |
| 4,630,532 | A | * | 12/1986 | Sonnentag et al. | 99/279 |
| 4,679,368 | A | | 7/1987 | Pettinga et al. | |
| 4,705,187 | A | * | 11/1987 | Linn | 220/819 |
| 4,754,948 | A | * | 7/1988 | Casciani | 248/680 |
| 5,076,525 | A | * | 12/1991 | Whipple | 248/300 |
| 5,599,470 | A | | 2/1997 | Peotter et al. | |
| 5,620,620 | A | | 4/1997 | Feldhausen et al. | |
| 5,624,589 | A | | 4/1997 | Latvis et al. | |
| 5,678,693 | A | * | 10/1997 | Tapp et al. | 206/454 |
| 5,734,148 | A | | 3/1998 | Latvis et al. | |
| 5,928,535 | A | | 7/1999 | Trinkner et al. | |
| 6,095,574 | A | | 8/2000 | Dean | |
| 6,103,995 | A | | 8/2000 | Bankstahl | |
| 6,186,357 | B1 | | 2/2001 | Kyle | |
| 6,227,018 | B1 | | 5/2001 | Miller et al. | |
| 6,416,144 | B1 | | 7/2002 | Houston et al. | |
| 6,674,046 | B2 | | 1/2004 | Bankstahl et al. | |
| 6,959,972 | B2 | * | 11/2005 | Cude et al. | 312/329 |
| 2004/0178182 | A1 | | 9/2004 | Radtke | |
| 2005/0086878 | A1 | * | 4/2005 | Feucht et al. | 52/200 |

* cited by examiner

*Primary Examiner*—Janet M. Wilkens
*Assistant Examiner*—Timothy M Ayres
(74) *Attorney, Agent, or Firm*—Fay Sharpe LLP

(57) ABSTRACT

An electric arc engine welder housing has an opening defined by the housing and a door connected to the housing. The door has a first panel and a second panel. The second panel has a pair of members extending from opposite ends of the second panel. The members are selectively received by slots formed on opposite walls of the opening. The members slide along the slots during movement of the second panel. The housing has mounting brackets each of which has a first leg and a second leg, each having an opening therethrough. The legs are substantially perpendicular to one another. The first leg is mounted to a side wall of the cabinet, and the second leg is mounted to a support surface for the cabinet. Fastening members secure the legs to the cabinet side wall and the support surface.

18 Claims, 10 Drawing Sheets

ENGINE WELDER CABINET

The present invention relates to electric arc welding and more particularly to a cabinet useful for shipping, handling, and installing engine driven welding machines.

INCORPORATION BY REFERENCE

The present invention relates to an engine driven welder having a surrounding outer, sheet metal cabinet, such as illustrated in patent publication 2004/0182846 incorporated by reference herein. This cabinet has two parallel side walls, a back panel and a front panel, with the front panel including manually operated devices for controlling the welding operation and operation of the internal combustion engine driving the alternator. Cabinets for engine driven welders are common in the welding industry and representative cabinet structures are illustrated in Peotter U.S. Pat. No. 5,599,470; Latvis U.S. Pat. No. 5,624,589; Trinkner U.S. Pat. No. 5,928,535; Bankstahl U.S. Pat. No. 6,674,046 and Feldhausen, et al. U.S. Pat. No. 5,620,620. These patents are also incorporated by reference herein to illustrate background cabinets to which the present invention is directed. Mounting brackets used with such cabinets are illustrated in Bankstahl U.S. Pat. No. 6,103,995 which is also incorporated by reference herein.

BACKGROUND OF INVENTION

It is common practice to perform complex welding operations in the field instead of in a factory; therefore, a large segment of the electric arc welding business has been directed to freestanding, movable welders. In practice, such welders are commonly a power source having a rectified input driven by an AC signal from an alternator rotated by an internal combustion engine.

It is well known to provide doors or openable panels on housings of electric arc engine welders for providing access therein. Access within the housing of an electric arc engine welder allows components contained within the housing to be serviced or replaced when desired. Often, the doors or panels of engine welder housings are adapted to be removable from their respective housings for purposes of allowing the doors or panels to be totally removed as obstructions when desirable to work on one or more of the components contained within the engine welder housing.

One improvement in the cabinet structure of an engine welder has been to provide a pivoted door on the front panels. The various gages and input devices are mounted onto this pivoted door. The maintenance of the door mounted components or devices can be done by pivoting the door. This allows access from either the back side or the front side. Thus, door mounted components are easily repaired by opening the door. This is an advantage of units sold by The Lincoln Electric Company of Cleveland, Ohio; however, this pivoted front panel door does not sufficiently address the problem of accessibility for the many operating components of the engine welder.

One problem with removable doors or panels on engine welder housings is that they may inadvertently separate from the engine welder housing at times when such separation is not desirable. Thus, there is a need for a door assembly that allows a door to be easily slidable and positioned in a stored position while eliminating or reducing inadvertent separation of the door from the engine welder housing.

Engine driven welding machine cabinets are often used for overseas shipment. For efficient shipment in standard shipping containers, it is important that the welding machines be of a particular width, such as no wider than 30 inches. To obtain as much welding capacity as possible within the width limit, the welding machine bases are typically close to 30 inches wide. An example of a welding machine base that has minimum space requirements for both shipping and installation may be seen in U.S. Pat. No. 5,620,620.

Engine driven welding machines require care both when transporting them and when installing them. It is therefore often desirable that the welding machine base also include brackets. It is also desirable that these brackets be used to install the welding machine to a mounting or support surface. For example, the welding machine may be mounted by fasteners to the bed of a large truck or trailer. However, having brackets on the base that are accessible for handling and installing the welding machine presents the problem that the overall base width exceeds the maximum allowable shipping width.

Thus, it is desirable to provide mounting brackets that overcome the width requirement problems and others while providing more advantageous overall results.

SUMMARY OF THE INVENTION

The present invention provides a new and improved engine welder cabinet that overcomes the foregoing difficulties and others and provides the aforementioned and other advantageous features. More particularly, in accordance with one aspect of the invention, an electric arc engine welder is provided. In accordance with this aspect of the invention, the electric arc engine welder includes a cabinet having a cavity therein. The cabinet has two parallel side walls, a back panel and a front panel. An opening is defined by the housing and is connected to the cavity.

The present invention relates to a door assembly and, more particularly, to a slidable door assembly. The present invention finds particular application as a side door assembly for use on an electric arc engine welder and will be described with particular reference thereto. However, it is to be appreciated that the present invention may relate to other similar environments and applications.

In accordance with one aspect of the invention, an electric arc engine welder housing has a plurality of walls defining a cavity; an opening defined by the housing and connected to the cavity; and a door connected to the housing and selectively covering the opening. The door has a first panel and a second panel, which are releasably connected to each other. The second panel has a pair of members extending from opposite ends of the second panel. The members are selectively received by slots formed on opposite walls of the opening. The members slide along the slots during movement of the second panel.

In accordance with another aspect of the present invention, a mounting bracket is provided for an engine driven welding machine that enables the machine to be conveniently shipped and installed. This is accomplished by fabricating the bracket to be interchangeable between a shipping mode and an installation mode.

In accordance with another aspect of the present invention, a welder machine cabinet has a plurality of side walls, a top wall and a bottom wall, and has at least one mounting bracket with a first leg and a second leg, each leg having an opening therethrough. The legs are substantially perpendicular to one another. The first leg is mounted to one of the side walls of the cabinet, and the second leg is mounted to an associated support surface for the cabinet. A pair of fastening members secure the legs to the cabinet side wall and the support surface through a first opening in the side wall and an opening in the support surface aligned with the openings in the legs in an installation mode.

In accordance with another aspect of the present invention, a welder cabinet has a side wall and a bottom wall having a mounting bracket having a first leg and a second leg each having an opening therein. The wall has an opening therein and the bottom wall has a slot therein. The slot extends along a longitudinal length of the bottom wall. The opening of the first leg is aligned with the opening of the side wall, and the opening of the second leg is aligned with an opening in an associated support surface in an installation mode.

In accordance with another aspect of the present invention, a welder cabinet has a side wall, a top wall, and a bottom wall. A mounting bracket has a first leg and a second leg approximately perpendicular to each other, each leg has an opening. The side wall comprises a first portion of a slot and the bottom wall comprises a second portion of a slot, wherein the first portion and the second portion are substantially perpendicular to each other. The side wall further has an opening. The first portion of the slot is formed by an indented portion of the side wall. The second portion of the slot is formed by an indented portion of the bottom wall. The first portion of the slot selectively receives the first leg of the mounting bracket in an installation mode.

When the mounting brackets are in the shipping mode, typically only one leg extends beyond the walls of the cabinet. The overall width of the welding machine cabinet is thus usually increased only by the thickness of the material of one of the legs of the brackets. Thus, the mounting brackets do not defeat the goal of keeping the overall welding machine cabinet width to a minimum.

According to one aspect of the present invention, a door is provided which is not removable from the welding cabinet housing.

According to another aspect of the present invention, the door includes a first panel and a second panel which are releasably secured together.

According to yet another aspect of the present invention, the door second panel has pins which engage slots in the cabinet to move the panel from a closed to an opened position.

According to another aspect of the present invention, the door has a third panel which is hingedly attached to the second panel, and folds behind the second panel in an opened position.

According to still another aspect of the present invention, mounting brackets are secured to the welding cabinet to mount the cabinet to a support surface.

According to yet another aspect of the present invention, slots are formed in the side walls and bottom wall of the cabinet to selectively receive legs of the mounting brackets to minimize the amount that the brackets extend beyond the exterior of the cabinet.

Still other aspects of the invention will become apparent from the following description taken together with the accompanying drawings.

BRIEF DESCRIPTION OF THE DRAWINGS

The invention may take form in certain components, structures, and steps, the preferred embodiments of which will be illustrated in the accompanying drawings.

DETAILED DESCRIPTION

Figure 1:
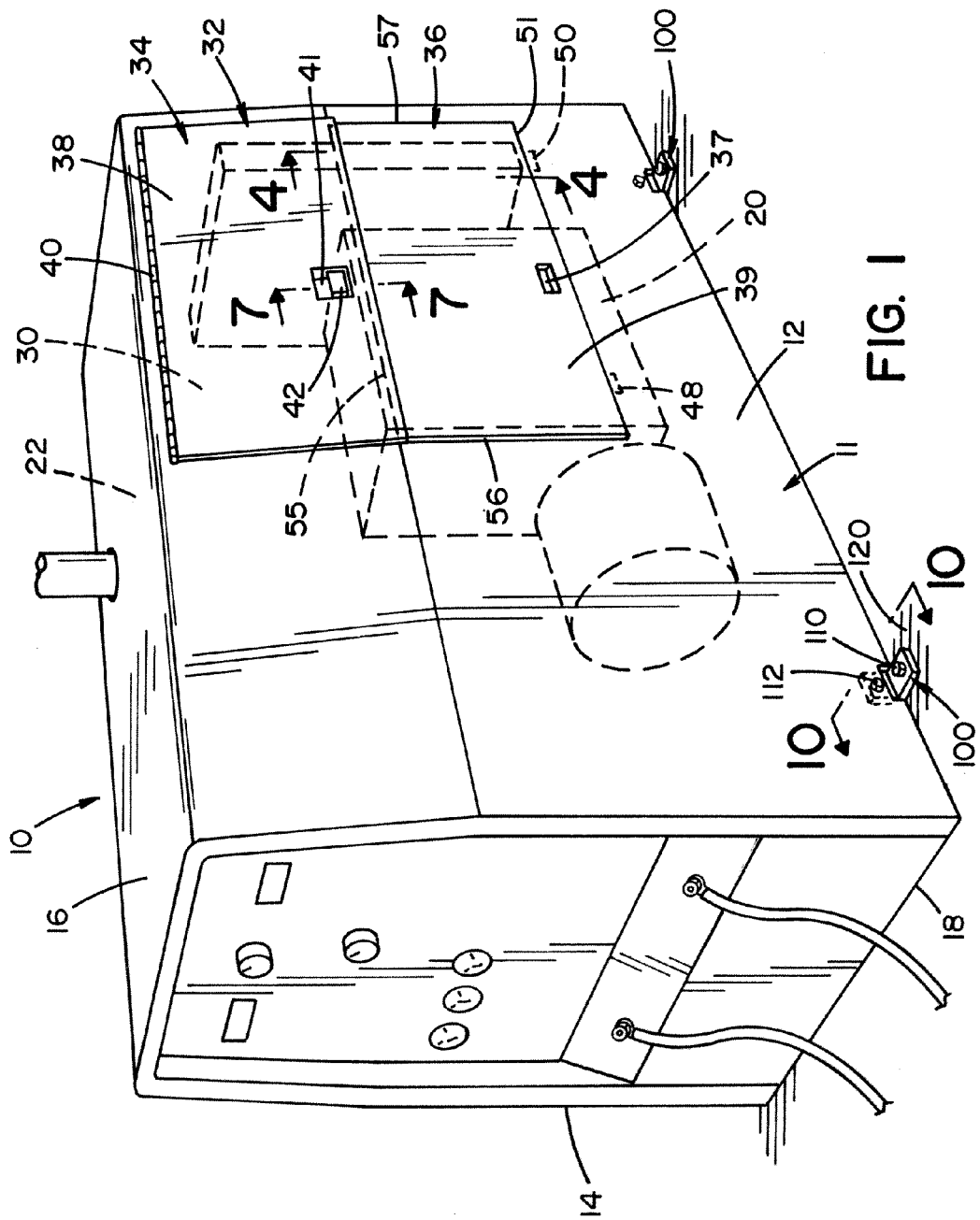
FIG. 1 is a perspective view of an engine welder cabinet in accordance with a preferred embodiment of the present invention.

Referring now to the drawings wherein the showings are for the purpose of illustrating preferred embodiments of the invention only, and not for the purpose of limiting same, FIG. 1 shows a typical engine driven welding machine 10 that includes the present invention. The welding machine 10 comprises a housing 11 having side walls 12, 14, a top wall 16 and a bottom wall 18. The bottom wall 18 supports an internal combustion engine 20. The engine rotates a generator, which produces electrical power suitable for performing welding operations. The machine also supports a fuel tank, which supplies the engine with fuel. The welding machine cabinet housing is invariably fabricated of steel components, whereas the fuel tank is usually molded from a synthetic material.

The housing 11 has a cavity 22 therein for operatively receiving components of the engine arc welder. The housing 11 further defines a housing opening 30 connected to the cavity for providing access thereto. A door assembly 32 is provided adjacent the opening 30 for selectively providing access into the housing to one or more of the components of the engine welder contained therein.

Figure 7:
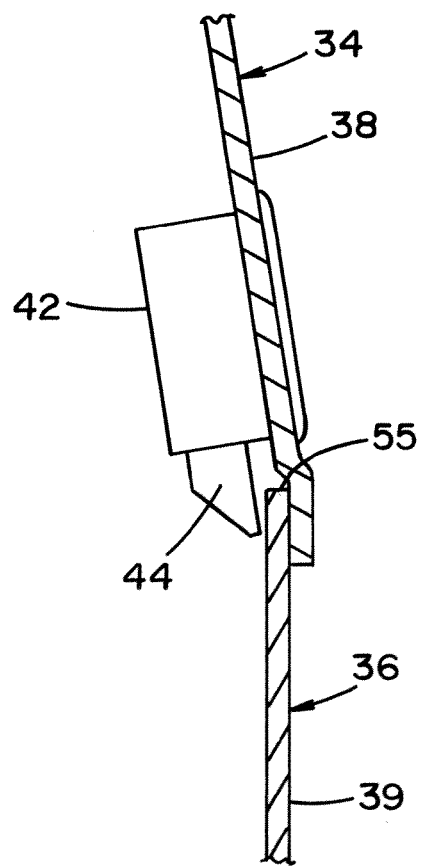
FIG. 7 is a side elevational view, in partial cross-section, of a latch mechanism for securing the upper door panel to the lower door panel, taken along lines 7-7 of FIG. 1.

More particularly, the door assembly 32 includes a first door or upper panel 34 and a second door or lower panel 36. First panel 34 overlaps second panel 36 in a closed configuration. The door panels 34 and 36 include generally flat front faces 38 and 39. First panel 34 is connected via a pivoting mechanism such as hinge 40 to side wall 12 of the housing. Referring to FIG. 7, a latch mechanism 42 with an extending tab 44 locks panel 34 into position with panel 36 by protruding behind second panel 36. The latch can be spring biased and have a second tab which is moved to raise the tab 44 out of engagement with panel 36. A slot 41 is formed in the first panel to provide access to the latch.

Figure 2:
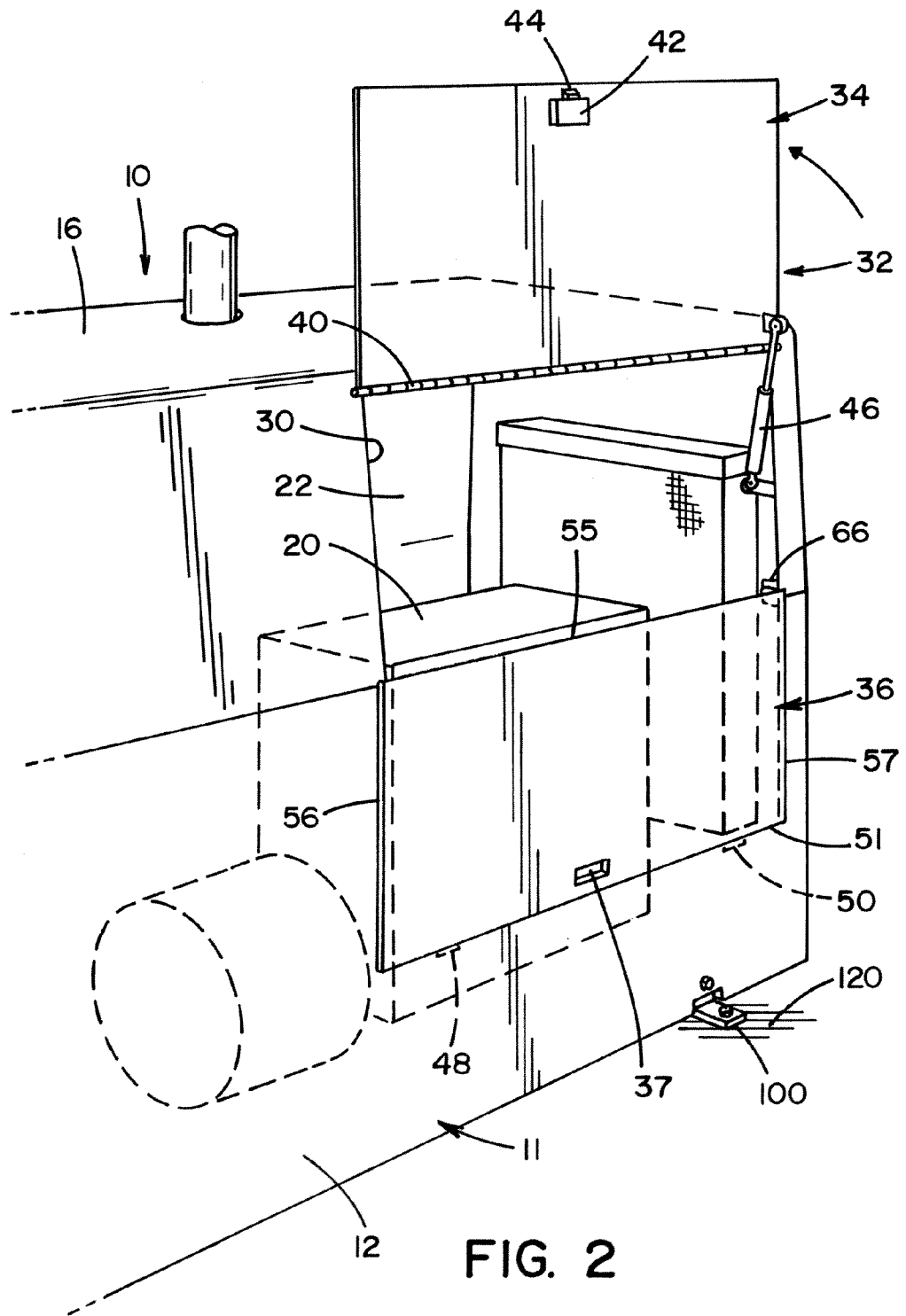
FIG. 2 is a perspective view of a door assembly of the cabinet of FIG. 1 with a panel of the door in an opened configuration, in accordance with a preferred embodiment of the present invention.

Referring now to FIG. 2, a locking assembly 46, such as a conventional compression spring rod assembly or any other suitable extending rod mechanism, can be used to raise or swing the panel 36 to the open or raised position, and secure the panel in the raised position.

Figure 3:
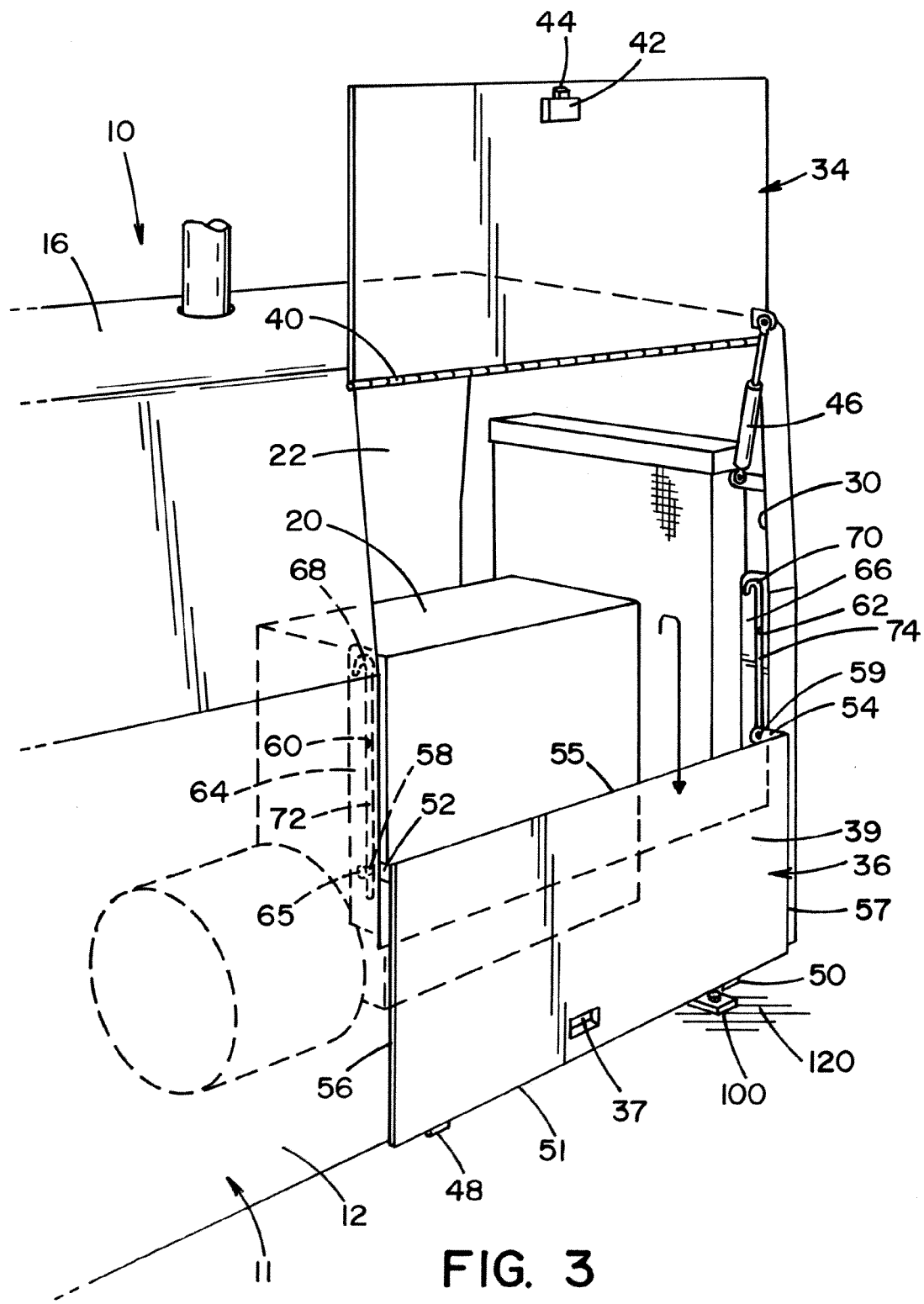
FIG. 3 is a perspective view of the door assembly of FIG. 2 with two panels in an opened configuration.
Figure 4:
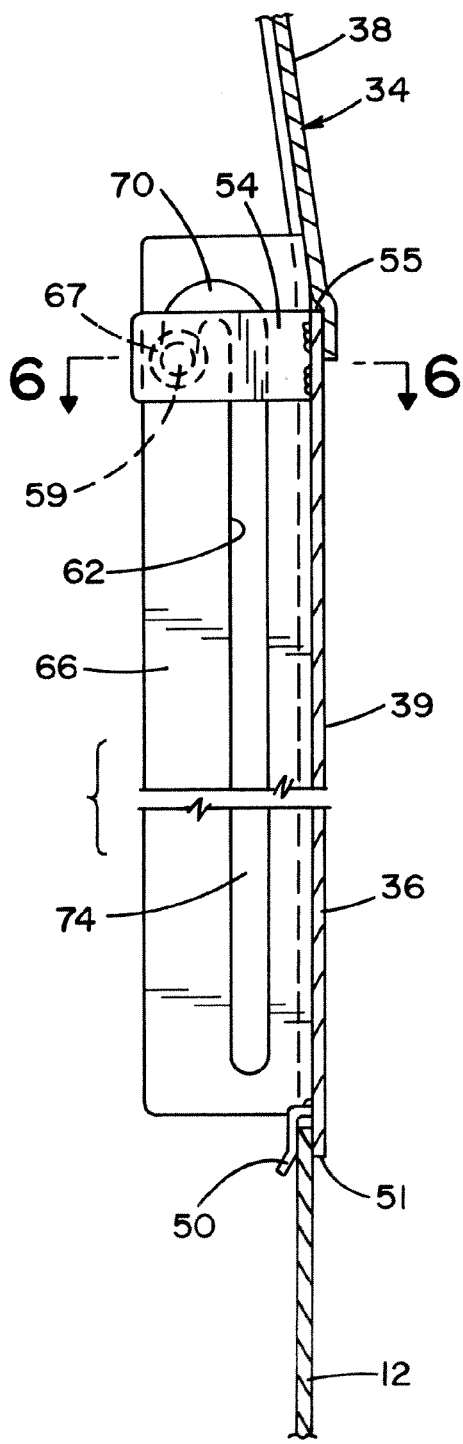
FIG. 4 is a side elevational view in partial cross-section, of the door assembly of FIG. 2 illustrating a hook assembly for securing an upper panel of the door, taken along lines 44 of FIG. 1.
Figure 5:
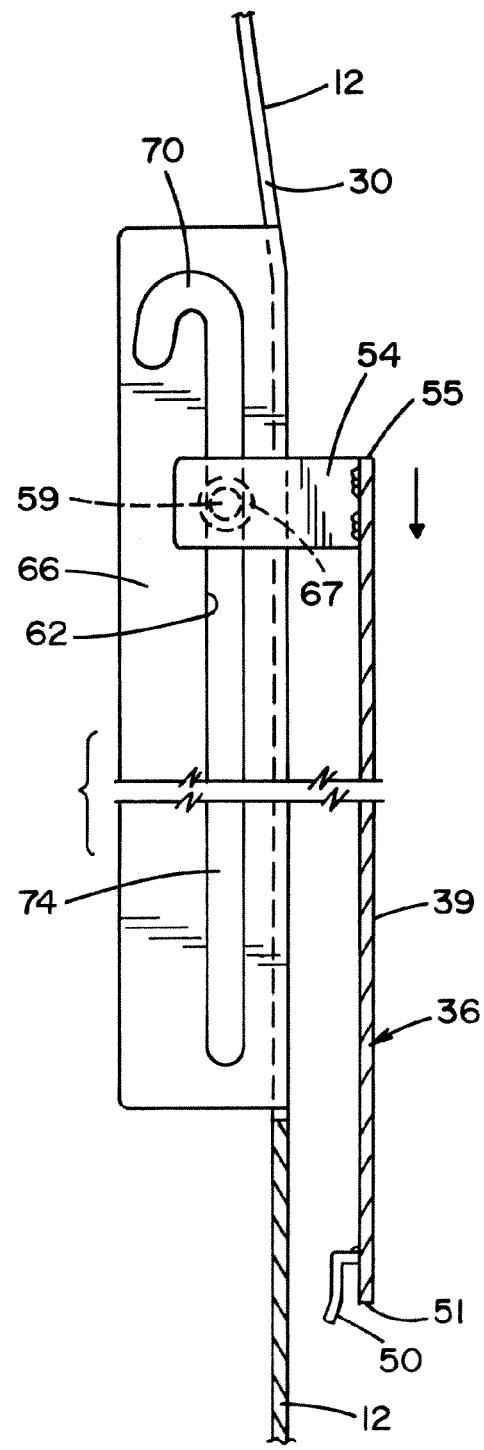
FIG. 5 is a side elevational view, in partial cross-section, of the hook assembly of FIG. 4 showing the upper door panel lowered into an opened configuration.

Referring now to FIGS. 3, 4 and 5, second panel 36 is secured to the housing via a pair of resilient clips 48, 50 located adjacent a bottom end 51 of the panel. A pair of plates 52, 54 are secured to a top end 55 of the panel at substantially 90° with respect to the front flat surface 39 of the panel. The plates are at opposite ends of the panel 56, 57, respectively and have pegs or pins 58, 59 that are received by grooves or slots 60, 62 formed in walls 64, 66 within the housing on opposite sides of opening 30.

Figure 6:
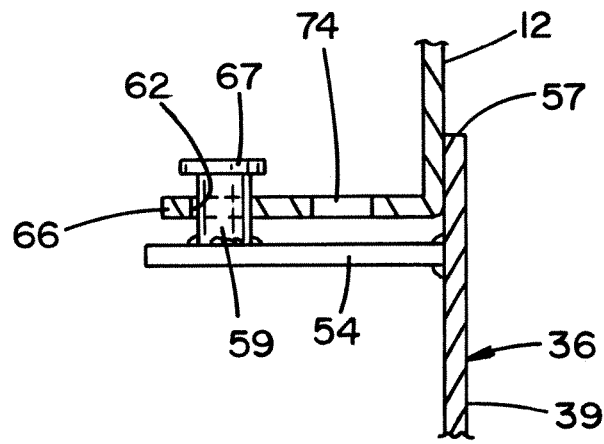
FIG. 6 is a top plan view, in partial cross-section, of the hook assembly of FIG. 4, taken along lines 6-6.

Referring now to FIG. 6, the pins 58, 59 have end members 65, 67 which have a diameter greater than an outer dimension or diameter of the pin bodies to retain the pins within the slots. The pins are welded or otherwise secured to plates 52, 54. The pins are shown to be round; however, square or other shape pins can be used without departing from the scope of the present invention.

The grooves 60, 62 each has a curved or arcuate upper portion 68, 70, respectively, and a straight, linear portion 72, 74 extending downwardly from the curved portions as best seen in FIGS. 4 and 5. Other configurations of the grooves can be used without departing from the scope of the present invention. As seen in FIGS. 4 and 5, to release the panel 36 and lower it to expose opening 30, panel 34 is released and moved out of engagement with panel 36 by depressing hinge 42. Then, panel 36 is lifted vertically either manually or by other means engaging a slot 37 formed in the second panel to release engagement of the clips 48, 50 with side wall 12. Then, the panel is moved horizontally outward while the pins 58, 59 ride over the curved slots 68, 70 and then slide downwardly along vertical slots 72, 74 into the down position shown in FIG. 3. At this point, opening 30 is fully exposed, allowing access to the arc welding components within housing 11.

Figure 8:
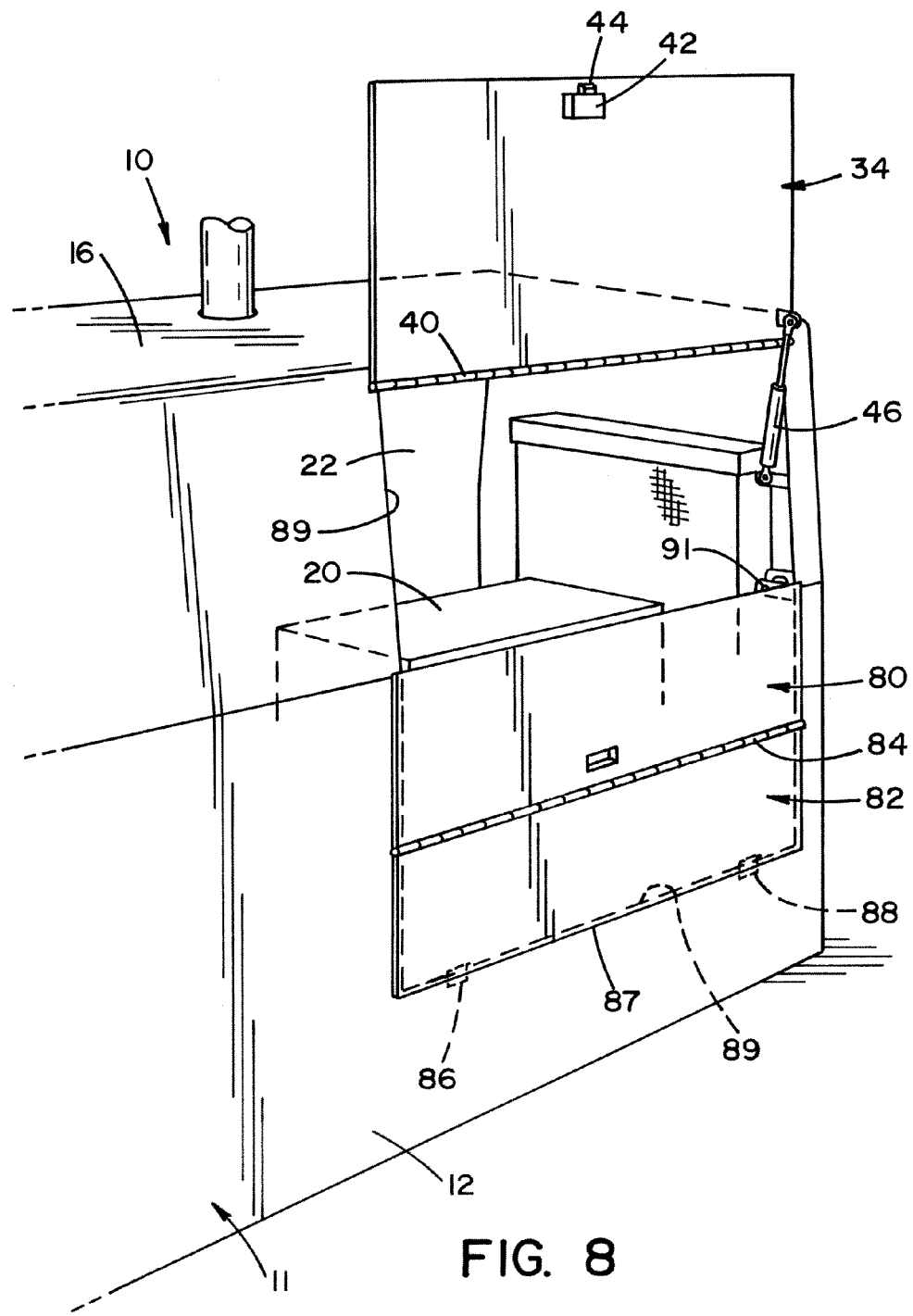
FIG. 8 is a perspective view of a door assembly with an upper panel in an opened configuration, in accordance with an alternate embodiment of the present invention.
Figure 9:
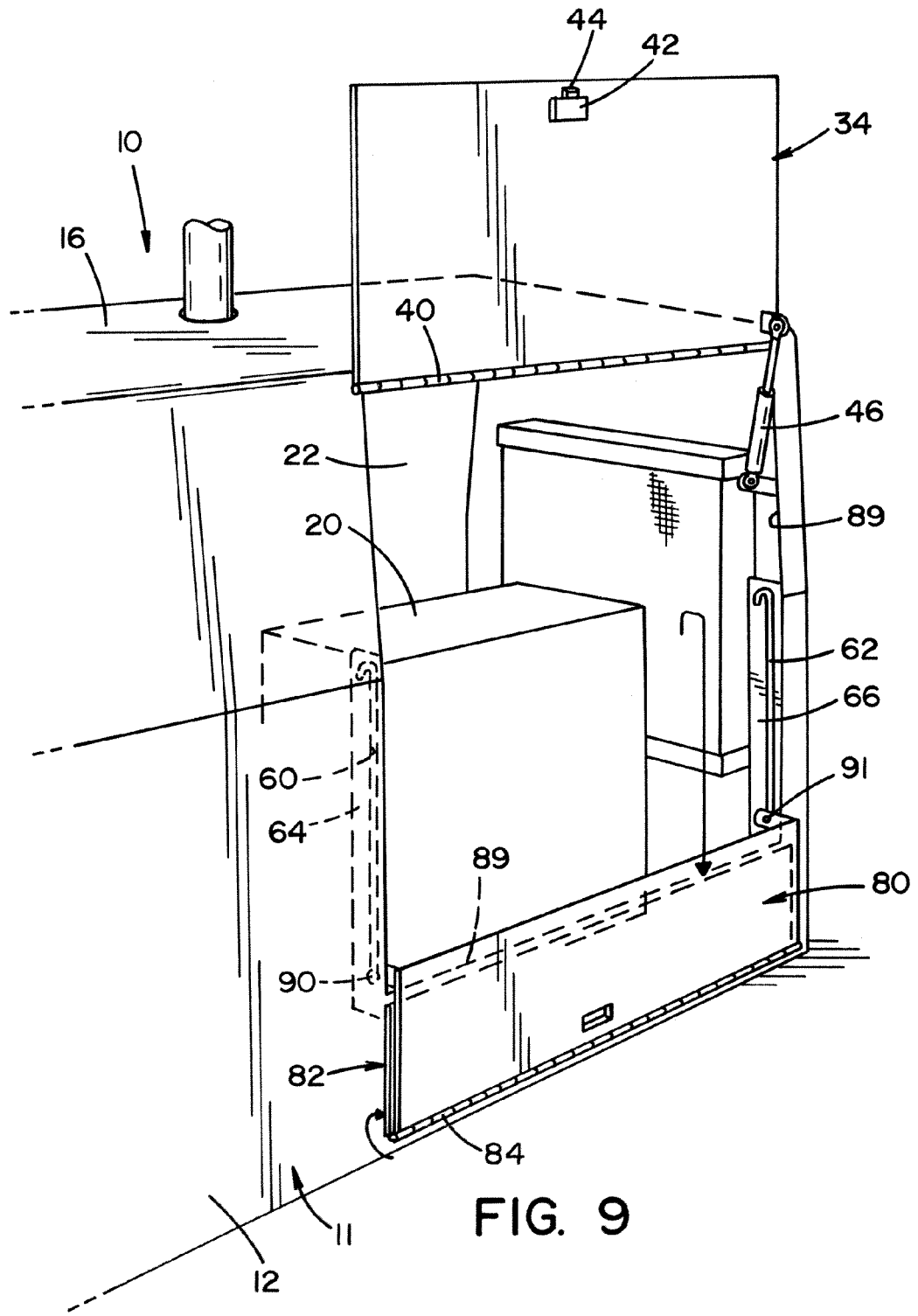
FIG. 9 is a perspective view of the door assembly of FIG. 8 illustrating the upper and lower door panels, in an opened configuration.

Referring now to FIGS. 8 and 9, an alternative embodiment of the slidable door arrangement is shown. First door panel 34 is the same as discussed above and as shown in FIGS. 1-5. Second and third door panels 80, 82 extend below first door panel and are hinged or connected together via a pivoting mechanism such as hinge 84. Two clips 86, 88 extend from a bottom end 87 of panel 82 and secure the panel to opening 89 of the side wall 12 of the housing. The second panel 80 also has a pair of pins 90, 91 which are inserted through a slot in the side walls, as shown and described for FIGS. 3 through 6. The second panel is first lifted vertically and then moved horizontally to move the pins along the slots 60, 62 in the sidewall. As the second and third panels are moved downwardly, third panel 82 is folded upwardly about hinge 84 and swings behind second panel 80 such that the panels are adjacent and substantially parallel to each other, as shown in FIG. 9. This configuration permits a larger size opening 89 to be formed in side wall 12. This also allows the second and third panel to occupy the same amount of space as a single panel, thus reducing space requirements.

Figure 10:
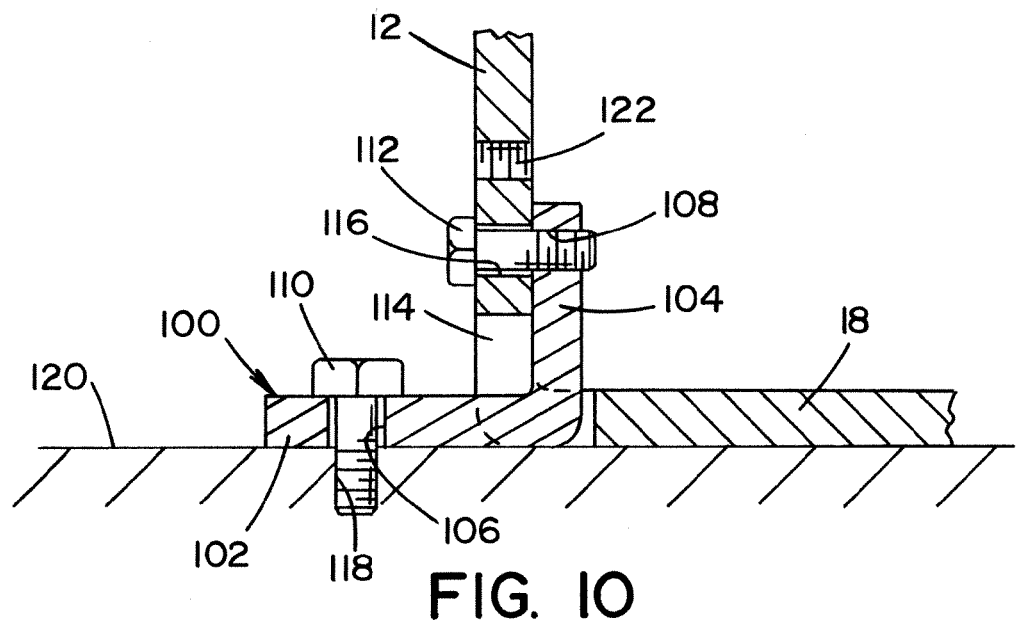
FIG. 10 is a side elevational view, in cross-section, of a mounting bracket, in accordance with a preferred embodiment of the present invention in an installation configuration.
Figure 11:
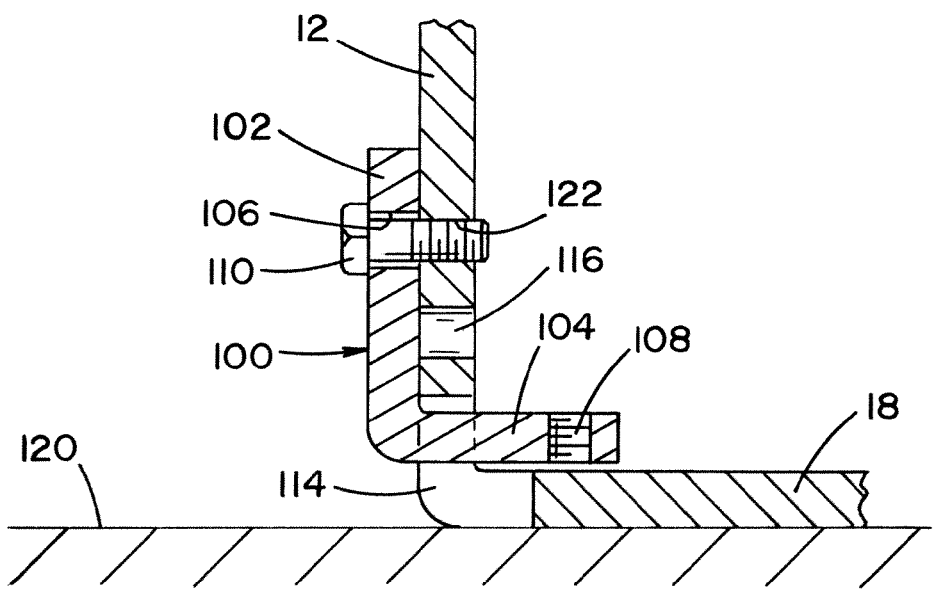
FIG. 11 is a side elevational view, in cross-section, of a mounting bracket of FIG. 6, in a shipping configuration.

In accordance with another aspect of the present invention, referring to FIGS. 10 and 11, several mounting brackets 100 are incorporated into the welding machine housing 11. The mounting brackets are used to install the welding machine to a mounting surface 120, such as a truck bed, trailer or similar surface. As shown on FIG. 1, there are two mounting brackets 100 on each of side walls 12 and 14 of the welding machine housing 11. However, if desired, more than four mounting brackets can be used on the machine cabinet without departing from the scope of the present invention.

Each substantially L-shaped mounting bracket 100 has a first leg 102 and a second leg 104 at a right angle or substantially 90° with respect to the first leg. A length of approximately 1.50 to 2.00 inches for each leg 102 and 104 is typically satisfactory. Leg 102 is shown to be longer than leg 104, but equal lengths or leg 104 having a greater length than leg 102 would not depart from the scope of the invention. The mounting bracket may be made of a material such as a cold rolled steel approximately 0.25 inches thick.

The legs 102, 104 have openings 106, 108, respectively, for receiving fastening members 110, 112 such as screws. A diameter of approximately 0.44 to 0.50 inches for the holes 106, 108 is typically satisfactory.

FIG. 10 shows the mounting bracket 100 in an installation mode. In that situation, the second leg 104 of the mounting bracket is inserted into a substantially L-shaped slot 114 formed in side wall 12 and bottom wall 18 and is tilted upwardly until opening 108 in leg 104 aligns with opening 116 in side wall 12. Leg 104 is mounted parallel to and adjacent an inner surface of side wall 12. Screw 112 is then threaded into both threaded openings 116 and 108. Opening 106 of leg 102 is aligned with opening 118 of surface 120 and screw 110 is threaded into threaded openings 106, 118. Threaded hole 116 may be formed in a boss in the side wall 12. Alternately, the threaded hole 116 may be part of a nut welded to the inside of the side wall.

FIG. 11 shows the mounting bracket in the shipping mode. To place a mounting bracket in the shipping mode, the screws 110, 112 are removed from the holes 116, 118 and the mounting bracket set of holes 106, 108. The mounting bracket is then rotated so that leg opening 106 is aligned with opening 122 in side wall 12. Screw 110 is threadably inserted into openings 106, 122. Leg 102 is mounted parallel to and adjacent an outer surface of side wall 12. Leg 104 is again inserted into slot 114, and is positioned so that it is essentially parallel to bottom wall 18. However, leg 104 is not secured into place as it is in the installation mode.

When the mounting brackets 100 are in the shipping mode, they add only a minimal amount to the overall width of the welding machine housing 11. Specifically, machine width is increased only to the extent of the thickness of the bracket material and the height of the heads of the screws 110. Accordingly, the welding machine can be packed in a cabinet that meets a width restriction for efficient space utilization of standard shipping containers, such as 30 inches.

Figure 12:
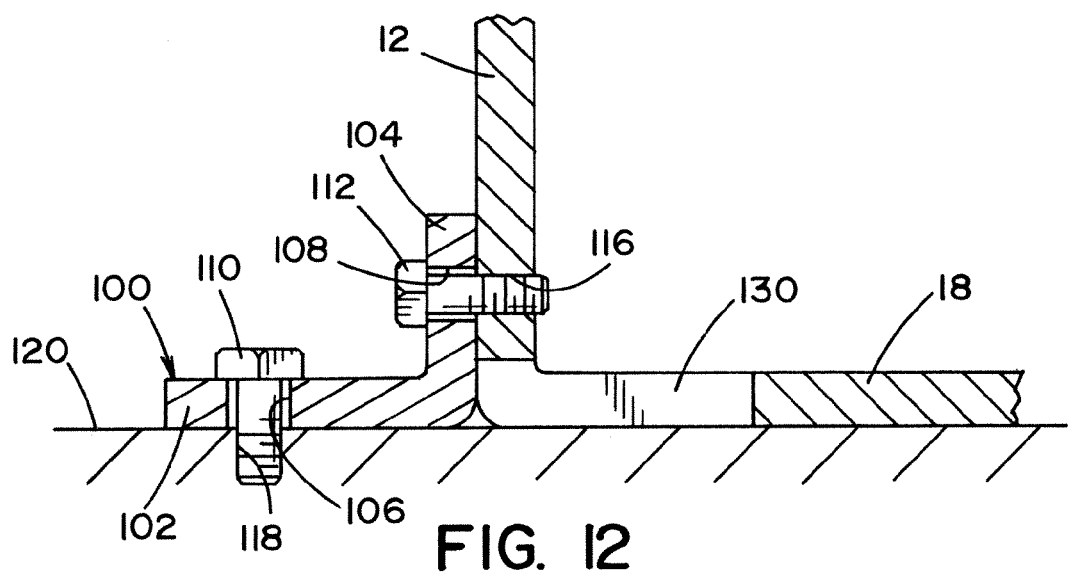
FIG. 12 is a side elevational view, in cross-section, of a mounting bracket, in accordance with an alternate embodiment of the present invention in an installation configuration.
Figure 13:
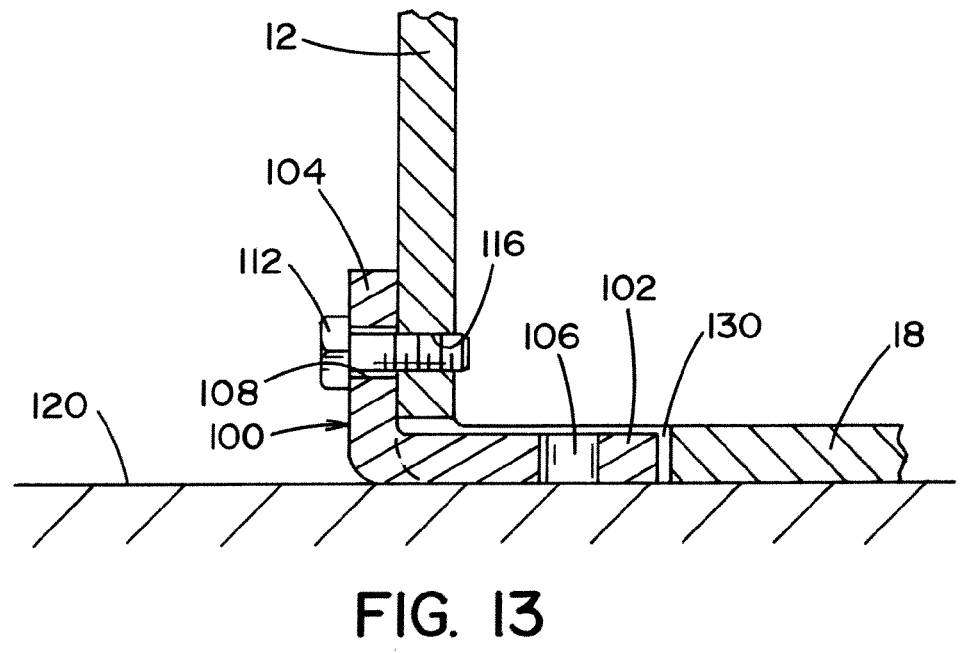
FIG. 13 is a side elevational view of the mounting bracket of FIG. 12, in a shipping configuration.

In an alternate embodiment, shown in FIGS. 12 and 13, a slot 130 is formed in the bottom wall 18 and side wall 12 of the housing and is longer along the bottom wall than the side wall. In the installation mode, mounting bracket 100 is mounted such that leg 104 is secured to an outer surface of side wall 12. Fastener or screw 112 is threaded into threaded openings 108 and 116. Leg 102 is mounted to support surface 120 via fastener or screw 110 which is threaded into opening 106 of leg 102 and opening 118 of surface 120.

In the shipping mode, screws 110 and 112 are removed and the mounting bracket is pivoted or rotated into the position illustrated in FIG. 13. That is, leg 102 is slid into slot 130 and leg 104 is secured to side wall 12 via screw 112 threaded through openings 108 and 116. Leg 102 is not secured into place in this configuration.

Figure 14:
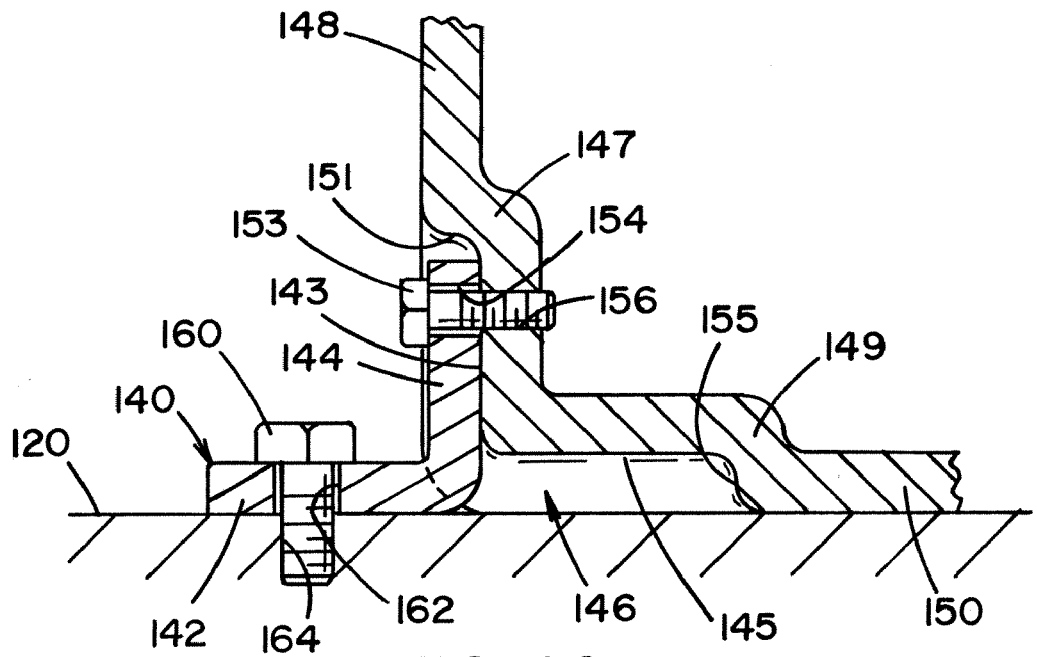
FIG. 14 is a side elevational view, in cross-section, of a mounting bracket, in accordance with another alternate embodiment of the present invention, in an installation configuration.
Figure 15:
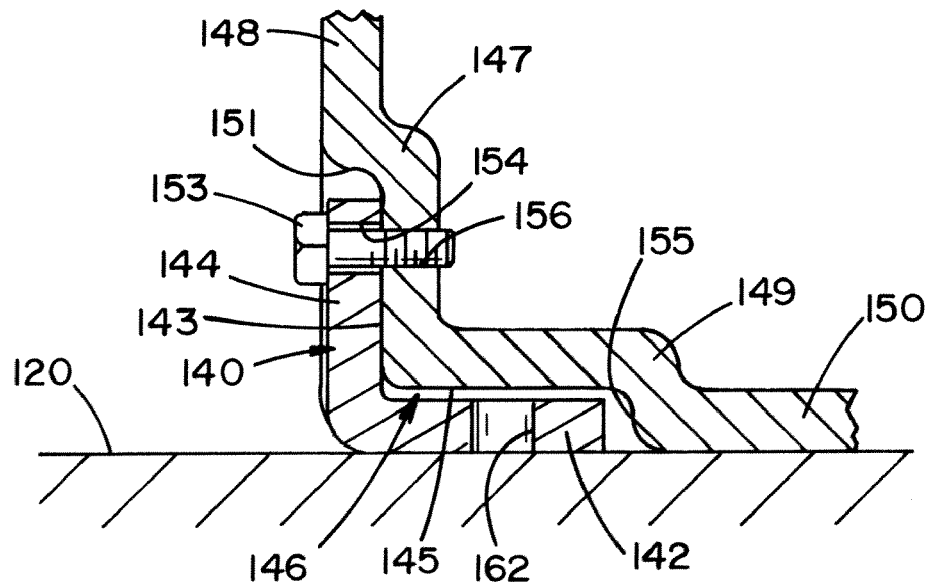
FIG. 15 is a side elevational view, in cross-section, of the mounting bracket of FIG. 14, in a shipping configuration.

In yet another alternate embodiment, shown in FIGS. 14 and 15, a mounting bracket 140 has legs 142 and 144 which are oriented at a right angle or substantially 90° to each other and are substantially the same length. An L-shaped slot 146 has an upper portion 143 formed in side wall 148 and a lower portion 145 formed in bottom wall 150. Side wall 148 has an indented wall portion 147 and bottom wall 150 has an indented wall portion 149 adjacent ends 151, 152 of slot 146 to form the upper and lower portions of the slot 146.

In the installation mode, mounting bracket 140 is secured to the housing via fastener or screw 153 which is threaded through openings 154, 156 of leg 144 and side wall 148, respectively. Leg 142 is secured to surface 120 via screw 160 which is threaded into threaded openings 162, 164 of leg 140 and surface 120, respectively.

In the shipping mode, the mounting bracket is rotated into the position shown in FIG. 15. Leg 144 is secured to an external surface of side wall 148 via screw 153 which is threaded into holes 154 and 156. Leg 142 is slid into slot 146 as shown in FIG. 15. Leg 142 is not secured to the cabinet. In this configuration, both legs are received by portions of slot 146 and do not protrude beyond the external surface of the side wall and bottom wall, except for a screw head of fastener 153.

The exemplary embodiments have been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

Having thus described the preferred embodiment, the invention is now claimed to be:

1. An electric arc engine welder housing located on a support surface, comprising:
a plurality of walls defining a cavity;
an opening defined by the housing and connected to the cavity;
a door connected to said housing and selectively covering said opening;
said door comprising a first panel and a second panel, said panels are releasably connected to each other;
said second panel comprising a pair of members extending from opposite ends of said second panel;
said members being selectively received by slots formed on opposite walls of said opening; wherein said members slide along said slots during movement of said second panel; and
a mounting bracket comprising a first member and a second member substantially perpendicular to said first member,
wherein in an installation mode one of said first and second members is mounted to an inner surface of one of said walls of said housing and the other of said first and second members is mounted to an associated support surface for said welder housing, and in a shipping mode one of said first and second members is mounted to an outer surface of one of said walls of said housing and the other of said members is inserted into a slot in one of said walls such that one of said first and second members is inside said housing.

2. The welder housing of claim 1, wherein said first panel comprises a latch positioned adjacent an end of said first panel, wherein said latch engages an end of said second panel to secure said first panel to said second panel.

3. The welder housing of claim 2, wherein said first panel comprises a slot on a surface of said first panel for providing access to said latch.

4. The welder housing of claim 1, wherein said first panel comprises a hinge assembly adjacent an end of said first panel for pivotably connecting said first panel to said opening.

5. The welder housing of claim 1, wherein said second panel comprises a slot for engaging said second panel to move said second panel from a closed position.

6. The welder housing of claim 1, wherein said second panel comprises at least one clip for securing an end of said second panel to said housing.

7. The welder housing of claim 1, wherein said first panel comprises an elongated locking member for locking said first panel in an opened position.

8. The welder cabinet of claim 1, wherein said slots in said walls of said housing each has an arcuate portion and a straight portion.

9. The welder cabinet of claim 8, wherein said arcuate portions are formed at upper ends of said slots and said straight portions extend from said upper ends of said slots to lower ends of said slots.

10. The welder cabinet of claim 1, wherein said members of said second panel comprise pins.

11. The welder cabinet of claim 10, wherein said pins comprise a first end attached to said second panel and a second end having a wall attached thereto, said wall having a length greater than an outer dimension of said pin.

12. The welder cabinet of claim 1, wherein said second panel comprises a pair of walls extending substantially perpendicular from opposing ends of said panel.

13. The welder cabinet of claim 12, wherein said members of said second panel extend from said pair of walls of said second panel approximately perpendicular to said walls.

14. The welder cabinet of claim 1, wherein an end of said first panel overlaps an end of said second panel in a closed configuration.

15. A welder machine cabinet located on a support surface, having a plurality of side walls, a top wall and a bottom wall defining a cavity, comprising:
at least one mounting bracket comprising a first leg and a second leg, each having an opening therethrough, said first leg and said second leg are substantially perpendicular to one another;
a pair of fastening members for securing said first and second legs to said cabinet side walls and an associated support surface for said cabinet through a first opening in one of said side walls and an opening in said support surface aligned with said openings in said first and second legs;
wherein said cabinet further comprising a slot formed between one of said side walls and said bottom wall;
wherein in an installation mode one of said first and second legs is mounted to an inner surface of one of said side walls of said cabinet and the other of said first and second legs is mounted to said support surface and in a shipping mode one of said first and second legs is mounted to a wall of said cabinet and the other of said legs is inserted into said slot so that said one of said legs is positioned inside said cabinet.

16. The welder machine cabinet of claim 15, wherein said side wall further has a second opening spaced from said first opening.

17. The welder cabinet of claim 15, wherein said one of said first and second legs which is inserted into said slot is positioned parallel to an internal surface of said side wall and said opening of said leg is aligned with said first opening of said side wall.

18. The welder cabinet of claim 16, wherein in said shipping mode said one of said first and second legs which is inserted into said slot is parallel to said bottom wall and the other of said first and second legs is mounted parallel to an external surface of said side wall such that said second opening of said side wall aligns with said opening of said other of said first and second legs.

* * * * *